(12) United States Patent
Vos et al.

(10) Patent No.: US 7,725,260 B2
(45) Date of Patent: May 25, 2010

(54) IMAGE-AUGMENTED INERTIAL NAVIGATION SYSTEM (IAINS) AND METHOD

(75) Inventors: David William Vos, Delaplane, VA (US); Behnam Motazed, Bethesda, MD (US); Vladislav Gavrilets, Fairfax, VA (US)

(73) Assignee: Athena Technologies, Inc., Warrenton, VA (US)

( * ) Notice: Subject to any disclaimer, the term of this patent is extended or adjusted under 35 U.S.C. 154(b) by 197 days.

(21) Appl. No.: 11/628,303

(22) PCT Filed: Jun. 2, 2005

(86) PCT No.: PCT/US2005/019411

§ 371 (c)(1),
(2), (4) Date: Oct. 31, 2007

(87) PCT Pub. No.: WO2005/119178

PCT Pub. Date: Dec. 15, 2005

(65) Prior Publication Data

US 2008/0177472 A1    Jul. 24, 2008

Related U.S. Application Data

(60) Provisional application No. 60/576,037, filed on Jun. 2, 2004.

(51) Int. Cl.
*G01C 21/00* (2006.01)

(52) U.S. Cl. ........................ 701/220; 701/223

(58) Field of Classification Search ................ 701/220, 701/223
See application file for complete search history.

(56) References Cited

U.S. PATENT DOCUMENTS

| 4,179,693 A | 12/1979 | Evans et al. |
| 4,476,494 A | 10/1984 | Tugayé |
| 4,489,322 A | 12/1984 | Zulch et al. |
| 4,700,307 A | 10/1987 | Mons et al. |
| 5,072,396 A | 12/1991 | Fitzpatrick et al. |
| 5,128,874 A | 7/1992 | Bhanu et al. |
| 5,155,774 A | 10/1992 | Numagami |
| 6,130,705 A | 10/2000 | Lareau et al. |
| 6,349,249 B1 | 2/2002 | Cunningham |
| 6,442,476 B1 | 8/2002 | Poropat |
| 6,594,600 B1 * | 7/2003 | Arnoul et al. ................. 702/94 |
| 6,912,464 B1 | 6/2005 | Parker |

FOREIGN PATENT DOCUMENTS

GB         2 289 389 A      11/1995

* cited by examiner

*Primary Examiner*—Mark Hellner
*Assistant Examiner*—Helal A Algahaim
(74) *Attorney, Agent, or Firm*—Finnegan, Henderson, Farabow, Garrett & Dunner, LLP

(57) ABSTRACT

An image-augmented inertial navigation system (LAWS) mounted on a vehicle (10) includes an inertial navigation system (INS) configured to estimate a navigation state vector and an imager (12) configured to output pixel signals associated with terrain features passing through a field of view (x, y, z) of the imager. The system (IAINS) further includes a processing unit operatively connected to the inertial navigation system (INS) and the imager (12). The processing unit is configured to sense a distance from the imager to a centroid of one or more of the terrain features passing though a field of view of the imager for a given image frame associated with the feature pixel signals. The processing unit is also configured to track each terrain feature as the terrain features pass through the field of view of the imager. The processing unit is further configured to update the navigation state vector of the inertial navigation system (INS) based on calculated NED (North, East, Down) coordinates position information of the inertial navigation system (INS) relative to the tracked terrain features.

7 Claims, 1 Drawing Sheet

IMAGE-AUGMENTED INERTIAL NAVIGATION SYSTEM (IAINS) AND METHOD

RELATED APPLICATIONS

This application claims the benefit of priority under 35 U.S.C. §119(e) of U.S. Provisional Application No. 60/576,037, filed on Jun. 2, 2004, the disclosure of which is incorporated herein by reference.

FIELD OF THE INVENTION

The present disclosure relates to systems and methods for navigating a vehicle. In particular, the present disclosure relates to an image-augmented inertial navigation system and method for a vehicle.

BACKGROUND OF THE INVENTION

The general methodology of a loosely-coupled inertial navigation system (INS) implements two steps for determining estimates of the navigation state vector of a body: (1) propagation of the navigation state vector via numerical (or other) integration of sensed accelerations and rates of the body, and (2) updates (or corrections) to the navigation state vector using external aiding sources. The external aiding source may be one or more of a wide variety of sources, the most common being satellite based navigation systems such as, for example, the USA's global positioning system (GPS). Such INS solutions are used for vehicle navigation, whether they are ground, air, space, or sea going vehicles. Sometimes, however, external aiding sources, such as GPS may become unavailable due to various reasons. For example, GPS may be jammed or may become unavailable due to location.

One possible way to overcome the unavailability of external aiding sources such as GPS includes traditional navigation by image processing. Traditional navigation by image processing registers the location of a newly detected image with respect to a known, stored image. Upon such successful geo-registration, the North, East, and Down (NED) coordinates of the image location may be used as an external aiding source to update the INS derived navigation state vector. Such image based geo-registration typically requires, however, a very powerful computer processing unit (CPU) since real-time geo-registration is very CPU intensive. Use of a very powerful CPU may be prohibitively expensive or may require space unavailable for certain applications.

As a result of the above-mentioned drawbacks, it may be desirable to provide a navigation system that enables a vehicle carrying such a system to obtain a continuous navigation solution, even in conditions where NED external aiding sources such as GPS become unavailable. Furthermore, it may be desirable to provide a navigation system that does not require a powerful CPU.

There may exist a desire to overcome one or more of the above-mentioned drawbacks. The exemplary disclosed systems and methods may seek to satisfy one or more of the above-mentioned drawbacks. Although the presently disclosed systems and methods may obviate one or more of the above-mentioned drawbacks, it should be understood that some aspects of the disclosed systems and methods might not necessarily obviate them.

SUMMARY OF THE INVENTION

In the following description, certain aspects and embodiments will become evident. It should be understood that the invention, in its broadest sense, could be practiced without having one or more features of these aspects and embodiments. It should be understood that these aspects and embodiments are merely exemplary.

In one aspect, as embodied and broadly described herein, the invention includes an image-augmented inertial navigation system including an inertial navigation system configured to estimate a navigation state vector and an imager configured to output pixel signals associated with terrain features passing through a field view of the imager. The system further includes a processing unit operatively connected to the inertial navigation system and the imager. The processing unit is configured to determine a distance from the imager to a centroid of one or more of the terrain features passing through the field of view of the imager for a given image frame based on the pixel signals. The processing unit is also configured to track each terrain feature from a first image frame to a second image frame as the terrain features pass through the field of view of the imager and calculate NED coordinates position information of each tracked terrain feature. The processing unit is further configured to update the navigation state vector of the inertial navigation system based on the calculated NED coordinates position information.

According to another aspect, a vehicle includes an image-augmented inertial navigation system. The system includes an inertial navigation system configured to estimate a navigation state vector and an imager configured to output pixel signals associated with terrain features passing through a field view of the imager. The system further includes a processing unit operatively connected to the inertial navigation system and the imager. The processing unit is configured to determine a distance from the imager to a centroid of one or more of the terrain features passing through the field of view of the imager for a given image frame based on the pixel signals. The processing unit is also configured to track each terrain feature from a first image frame to a second image frame as the terrain features pass through the field of view of the imager and calculate NED coordinates position information of each tracked terrain features. The processing unit is further configured to update the navigation state vector of the inertial navigation system based on the calculated NED coordinates position information.

According to yet another aspect, a method of updating a navigation state vector of an inertial navigation system associated with a vehicle includes determining a distance from an imager associated with the vehicle to a centroid of one or more terrain features passing through a field view of the imager for a given image frame. The method further includes tracking each terrain feature from a first image frame to a second image frame as the terrain features pass through the field of view of the imager. The method also includes calculating NED coordinates position information for each of the tracked terrain features and updating the navigation state vector of the inertial navigation system based on the calculated NED coordinates position information.

Aside from the structural and procedural arrangements set forth above, the invention could include a number of other arrangements, such as those explained hereinafter. It is to be understood, that both the foregoing description and the following description are exemplary.

BRIEF DESCRIPTION OF THE DRAWING

The accompanying drawing is incorporated in and constitutes a part of this specification. The drawing illustrates an exemplary embodiment of the invention and, together with the description, serves to explain some principles of the invention. In the drawing.

DESCRIPTION OF THE EMBODIMENTS

Figure 1:
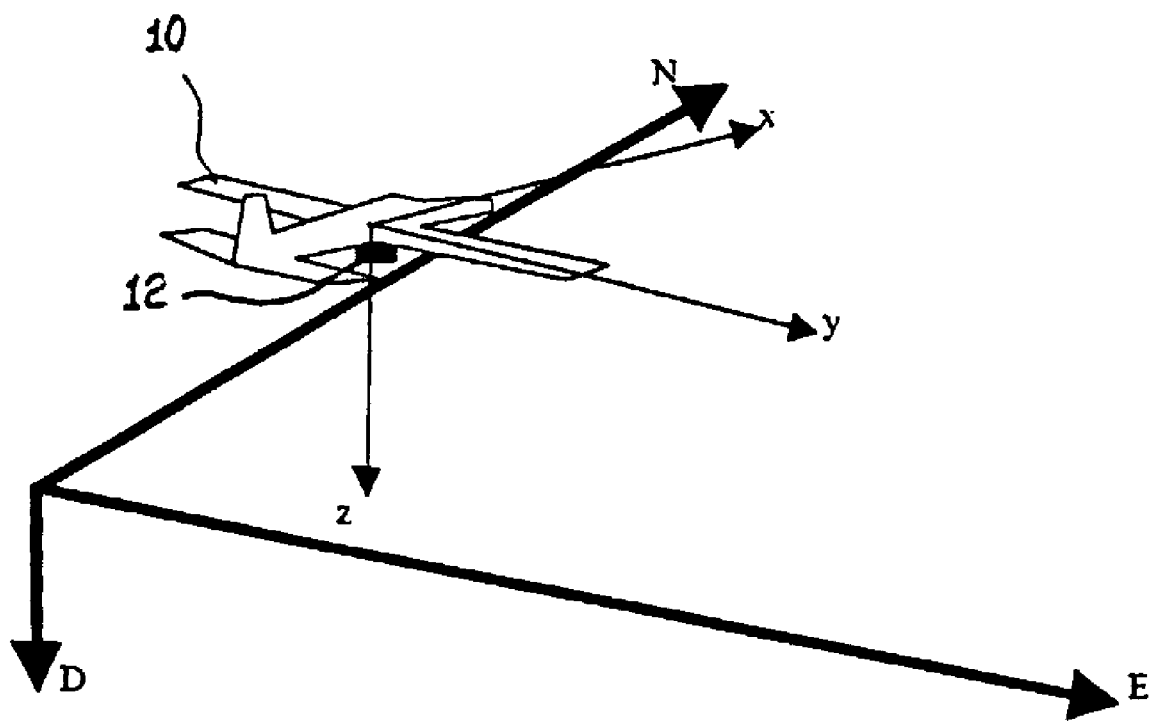
FIG. 1 is a schematic view of a vehicle oriented in a NED coordinate system, including an exemplary image-augmented inertial navigation system.

Reference will now be made in detail to some possible exemplary embodiments of the invention, an example of which is illustrated in the accompanying drawing. Wherever possible, the same reference numbers are used in the drawing and the description to refer to the same or like parts.

An exemplary image-augmented inertial navigation system (IAINS) includes an INS and an imaging payload that enables a vehicle carrying such an IAINS to obtain a continuous navigation solution, even in conditions where NED external aiding sources may become unavailable.

As schematically-depicted in FIG. 1, a host vehicle 10, such as for example, an airplane, carries an imager 12. The imager 12 may be, for example, a camera, lidar, radar or other similar device known to a person having ordinary skill in the art. The imager 12 may include a CPU or the CPU may be located separate from the imager 12. The imager 12 is aimed in the direction of a scene (e.g., a feature of the terrain over which the vehicle 10 is flying) to be imaged. There is no constraint on the orientation of the imager 12 with respect to the vehicle 10 and INS axes (x, y, z). Such an orientation may be either fixed or it may change in real-time, so long as the imager 12's orientation and offset is known with respect to the vehicle 10 and the INS axes at all times.

As the vehicle 10 moves over the terrain, the imager 12 observes a scene on the ground and projected images of the scene will move across the image plane of the imager 12. For simplicity, FIG. 1 depicts the imager 12's view direction as directly coincident with the vehicle 10 and INS z-axis, where the vehicle 10 and INS axes have aligned axes systems, although this is not required.

According to an exemplary image-augmented inertial navigation system, the concept combines two capabilities: (1) the capabilities of an INS system, and (2) the capabilities of an external aiding source. The combination provides data including (a) a pixel array of image information in image coordinates, (b) an associated range value representing the relative distance from the imager 12 (e.g., radar, lidar, video, or any other imaging system) to the ground location of a feature represented by the pixel, and (c) automated tracking of the feature as it moves through the image. The image-augmented navigation system according to some embodiments requires minimal image processing capability, thereby rendering a powerful CPU unnecessary. In fact, it may be sufficient, according to some embodiments, to identify high contrast features in the image plane and track the identified features from frame to frame, as the identified features move through the imager 12's field of view.

For example, the image-augmented inertial navigation system relative navigation external aiding source is used for navigation state vector updates in the following ways:

A. While an NED coordinates external aiding source is available:
1. the NED coordinates external aiding source could be a GPS, or
2. geo-registration by automatic recognition of landmarks in the image, ground based radar, or any other external aiding source that provides information in the form of NED coordinates location of the INS. This direct NED coordinates update to the INS navigation state vector occurs whenever such an external aiding source update becomes available.

B. When a new feature in the external aiding source begins to be tracked in the image: immediately upon first receipt of a newly identified feature, the NED coordinates location of this new $i^{th}$ tracked feature, $Xo_i(N,E,D)$, is tagged and frozen until such time as it leaves the imager 12's field of view. This may be achieved by projecting range between the actual feature and the imager 12, from the current known location of the INS via the image orientation and offset with respect to the INS.

C. When a new image becomes available and provides new information about all tracked features:
1. All of the tracked features must already be at least one image frame old, and each feature has an initial NED location defined by $Xo_i(N,E,D)$.
2. As the new image becomes available, determine the new image-based NED coordinates position estimate of the INS relative position referenced to each of the currently tracked features based on the following equation:

$$X(t)_i = Xo_i(N,E,D) + C\,R(t),$$

where $C\,R(t)$ represents the projected range via imager orientation and offset with respect to the INS 3. Use each of the NED position estimates of the INS calculated relative to each feature, $X(t)_i$, as an NED position update to the INS.

It will be apparent to those skilled in the art that various modifications and variations can be made to the structure and methodology of the present disclosure. Thus, it should be understood that the disclosure is not limited to the examples discussed in the specification. Rather, the present disclosure is intended to cover modifications and variations.

What is claimed is:

1. An image-augmented inertial navigation system comprising:
   an inertial navigation system configured to estimate a navigation state vector;
   an imager configured to output pixel signals associated with terrain features passing through a field view of the imager over a plurality of image frames; and
   a processing unit operatively connected to the inertial navigation system and the imager, the processing unit being configured to
      sense a distance from the imager to a centroid of one or more of the terrain features passing through the field of view of the imager for a given image frame based on the pixel signals,
      track each terrain feature from a first image frame containing the terrain feature to any subsequent image frame while the terrain features remain within the field of view of the imager,
      calculate NED coordinates position information of the inertial navigation system relative to first tagged coordinates of each tracked terrain feature, and
      update the navigation state vector of the inertial navigation system based on the calculated inertial navigation system position information.

2. The system of claim 1, wherein the processing unit is configured to track new terrain features as they pass within the field of view of the imager by determining the distance between the imager and the new terrain features and by predicting a distance between the new terrain features and the imager based on a current known location of the inertial navigation system.

3. The system of claim 1, wherein the processing unit is configured to determine and tag NED coordinates position information for new terrain features a first time the new terrain features enter into the field of view of the imager, based on the current inertial navigation system position, range to the new terrain feature, orientation and offset of the imager with respect to the inertial navigation system.

4. A vehicle comprising the system of claim 1.

5. A method of updating a navigation state vector of an inertial navigation system associated with a vehicle, the method comprising:

sensing a distance from an imager associated with the vehicle to a centroid of one or more terrain features passing through a field of view of the imager for a given image frame;

tracking each terrain feature from a first image frame to a subsequent image frame as the terrain features pass through the field of view of the imager;

calculating NED coordinates position information for each of the tracked terrain features; and updating the navigation state vector of the inertial navigation system based on the calculated NED coordinates position information.

6. The method of claim 5, further comprising tracking new terrain features as they pass within the field of view of the imager by determining the distance between the imager and the new terrain features and by predicting a distance between the new terrain features and the imager based on a current known location of the inertial navigation system.

7. The method of claim 5, further comprising determining and tagging NED coordinates position information for new terrain features a first time the new terrain features enter into the field of view of the imager based on a current inertial navigation system position, range to the terrain new feature, orientation and offset of the imager with respect to the inertial navigation system.

* * * * *